United States Patent
Yim

(10) Patent No.: US 9,866,777 B2
(45) Date of Patent: Jan. 9, 2018

(54) IMAGE SENSOR AND DRIVING METHOD THEREFOR

(71) Applicants: Rayence Co., Ltd., Gyeonggi-do (KR); Vatech Ewoo Holdings Co., Ltd., Gyeonggi-do (KR)

(72) Inventor: Jo Seong Yim, Gyeonggi-do (KR)

(73) Assignees: Rayence Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 76 days.

(21) Appl. No.: 14/903,757

(22) PCT Filed: Jul. 8, 2014

(86) PCT No.: PCT/KR2014/006105
§ 371 (c)(1),
(2) Date: Jan. 8, 2016

(87) PCT Pub. No.: WO2015/005640
PCT Pub. Date: Jan. 15, 2015

(65) Prior Publication Data
US 2016/0156864 A1    Jun. 2, 2016

(30) Foreign Application Priority Data
Jul. 8, 2013    (KR) .......................... 10-2013-0079620

(51) Int. Cl.
*G01T 1/24*    (2006.01)
*H04N 5/378*   (2011.01)
(Continued)

(52) U.S. Cl.
CPC ............. *H04N 5/378* (2013.01); *H04N 5/232* (2013.01); *H04N 5/2351* (2013.01); *H04N 5/351* (2013.01)

(58) Field of Classification Search
CPC ...... H04N 5/232; H04N 5/378; H04N 5/2351; H04N 5/351; H04N 5/332; H04N 5/369; G06F 3/0416; G02F 2001/13312
(Continued)

(56) References Cited

U.S. PATENT DOCUMENTS 6,118,483 A    9/2000   Etoh
6,157,408 A    12/2000  Etoh
(Continued)

FOREIGN PATENT DOCUMENTS

JP    09-163390 A      6/1997
KR    10-2010-0038445 A   4/2010
KR    10-2011-0066483 A   6/2011

*Primary Examiner* — Taeho Jo
(74) *Attorney, Agent, or Firm* — IP Legal Services, LLC

(57) ABSTRACT

The objective of the present invention is to embody a convenient and reliable image sensor of an auto trigger scheme. The present invention provides a driving method for an image sensor in which pixels are arranged in a matrix form along row lines and column lines and which has a waiting mode and an image obtaining mode, the driving method for an image sensor comprising the steps of: when sequentially selecting a row line, applying a gate signal, and reading out a data signal for each frame in the waiting mode, calculating a variation between the data signal of the currently selected row line and the data signal of the same row line in the previous frame; and if the variation is greater than or equal to a threshold value, determining that light has been radiated.

13 Claims, 6 Drawing Sheets

(51) Int. Cl.
*H04N 5/232* (2006.01)
*H04N 5/235* (2006.01)
*H04N 5/351* (2011.01)

(58) Field of Classification Search
USPC .................................................. 250/370.09
See application file for complete search history.

(56) References Cited

U.S. PATENT DOCUMENTS

| | | | | |
|---|---|---|---|---|
| 6,801,598 B2* | 10/2004 | Tashiro | ................... | A61B 6/00 |
| | | | | 250/205 |
| 2002/0044211 A1* | 4/2002 | Tujii | ................... | G01T 1/2928 |
| | | | | 348/302 |
| 2003/0086523 A1* | 5/2003 | Tashiro | ................... | A61B 6/00 |
| | | | | 378/19 |
| 2006/0285843 A1* | 12/2006 | Sakurai | ................. | H04N 5/232 |
| | | | | 396/303 |
| 2010/0182470 A1* | 7/2010 | Sugawa | ................. | H04N 3/155 |
| | | | | 348/294 |
| 2012/0105404 A1* | 5/2012 | Gotoh | ................... | G06F 3/0412 |
| | | | | 345/207 |
| 2012/0256883 A1* | 10/2012 | Okada | ................... | G06F 1/3203 |
| | | | | 345/175 |
| 2012/0287093 A1* | 11/2012 | Gotoh | ................... | G06F 3/0412 |
| | | | | 345/204 |
| 2013/0063407 A1* | 3/2013 | Usukura | ............... | G06F 3/0412 |
| | | | | 345/207 |

* cited by examiner

IMAGE SENSOR AND DRIVING METHOD THEREFOR

CROSS REFERENCE TO RELATED APPLICATIONS

This application is a National Stage Patent Application of PCT International Patent Application No. PCT/KR2014/006105 (filed on Jul. 8, 2014) under 35 U.S.C. §371, which claims priority to Korean Patent Application No. 10-2013-0079620 (filed on Jul. 8, 2013), the teachings of which are incorporated herein in their entireties by reference.

TECHNICAL FIELD

The present invention generally relates to an image sensor and, more particularly, to an auto trigger-type image sensor, which automatically determines whether light has been irradiated, and to a method for driving the image sensor.

BACKGROUND ART

An image sensor, which is a device for detecting external optical image signals and converting the signals into electrical signals, has been mounted and widely used in various types of electronic equipment, and has been chiefly used especially in imaging devices.

In an image sensor, pixels that are photodetection units are arranged in a matrix form along row lines and column lines. In each pixel, a photoelectric conversion element is implemented and configured to convert light irradiated by a light irradiation device into an electrical signal.

Generally, the light irradiation device communicates with an image sensor so as to transmit a synchronizing signal indicating the irradiation of light to the image sensor. When a synchronizing signal is generated and transmitted, the image sensor may change its state from a standby mode to an image acquisition mode, read the electrical signal generated by light irradiation, and then acquire an image.

However, depending on the usage environment or the like of an imaging device, there are the cases where an image sensor and a light irradiation device are placed in a communication-disconnected state. In this case, an auto-trigger scheme is used in which an image sensor autonomously checks whether light has been irradiated and automatically triggers the driving of the image sensor.

However, in conventional technology, an additional photodetection element for determining whether light has been irradiated and generating a trigger signal is installed and used in the image sensor. Accordingly, there is inconvenience in that manufacturing cost is increased and the design of the image sensor is complicated.

Further, a conventional photodetection device is limited in promptly and accurately detecting whether light has been irradiated.

DISCLOSURE

Technical Problem

An object of the present invention is to implement a convenient and reliable auto trigger-type image sensor.

Technical Solution

In order to accomplish the above object, the present invention provides a method for driving an image sensor, the method being configured to drive an image sensor in which pixels are arranged in a matrix form along row lines and column lines, and which has a standby mode and an image acquisition mode, the method including, when row lines are sequentially selected in each frame in the standby mode, gate signals are applied to the row lines and data signals are read, calculating variation between data signals in a currently selected row line for a current frame and data signals in an identical row line for a previous frame, and determining that light has been irradiated if the variation is equal to or greater than a threshold.

Here, the variation between the data signals may be calculated using data signals in at least a part of the column lines. The method may further include, if it is determined that light has been irradiated, disabling output of gate signals to remaining row lines subsequent to the currently selected row line for the current frame. The image sensor may further include a stabilization mode, and repeat the standby mode, the image acquisition mode, and the stabilization mode. The method may further include, if it is determined that light has been irradiated, reading data signals, to which the light has been irradiated, for at least one frame in the image acquisition mode subsequent to the current frame; and after the data signals have been read, stabilizing levels of the data signals in the stabilization mode. Stabilizing the levels may include initializing the levels of the data signals; and sequentially reading data signals in the row lines, wherein variation between data signals in a currently selected row line in a first frame in the standby mode after the stabilizing, and data signals in an identical row line finally selected in the stabilization mode is calculated. The variation between the data signals may be variation between average values of the data signals in the row lines.

In another aspect, the present invention provides an image sensor, including a standby mode and an image acquisition mode, including a photoelectric conversion panel in which pixels are arranged in a matrix form along row lines and column lines; a gate driving circuit for sequentially selecting the row lines in each frame, and applying gate signals to the row lines; a data driving circuit for reading data signals from the selected row lines; and a light irradiation determination unit for calculating variation between data signals in a selected row line in a current frame in the standby mode and data signals in an identical row line in a previous frame, and determining that light has been irradiated when the variation is equal to or greater than a threshold.

Here, the light irradiation determination unit may calculate the variation using data signals in at least a part of the column lines. If the light irradiation determination unit determines that light has been irradiated, the gate driving circuit may disable output of gate signals to remaining row lines subsequent to the currently selected row line in the current frame. The image sensor may further include a stabilization mode, and repeats the standby mode, the image acquisition mode, and the stabilization mode. If the light irradiation determination unit determines that light has been irradiated, the data driving circuit may read data signals, to which the light has been irradiated, in the image acquisition mode subsequent to the current frame, and after the data signals have been read, the gate driving circuit and the data driving circuit may stabilize levels of the data signals in the stabilization mode. In the stabilization mode, the gate driving circuit and the data driving circuit may initialize the levels of the data signals and sequentially read data signals in the row lines, and in a first frame in the standby mode after the stabilization mode, the light irradiation determination unit may calculate variation between data signals in a currently selected row line, and data signals in an identical row line finally selected in the stabilization mode. The variation between the data signals may be variation between average values of the data signals in the row lines.

Advantageous Effects

According to the present invention, whether light has been irradiated may be determined by detecting variation between data signals in row lines in a current frame and a previous frame. Therefore, whether light has been irradiated may be promptly and accurately determined using a convenient method.

Further, after an image has been acquired, a stabilization period is set so as to stabilize the levels of data signals, after which a current state returns to a standby mode. Accordingly, errors, which may occur when determining whether light has been irradiated in the state in which data signals are unstable, may be minimized.

BEST MODE

Hereinafter, embodiments of the present invention will be described in detail with reference to the attached drawings.

Figure 1:
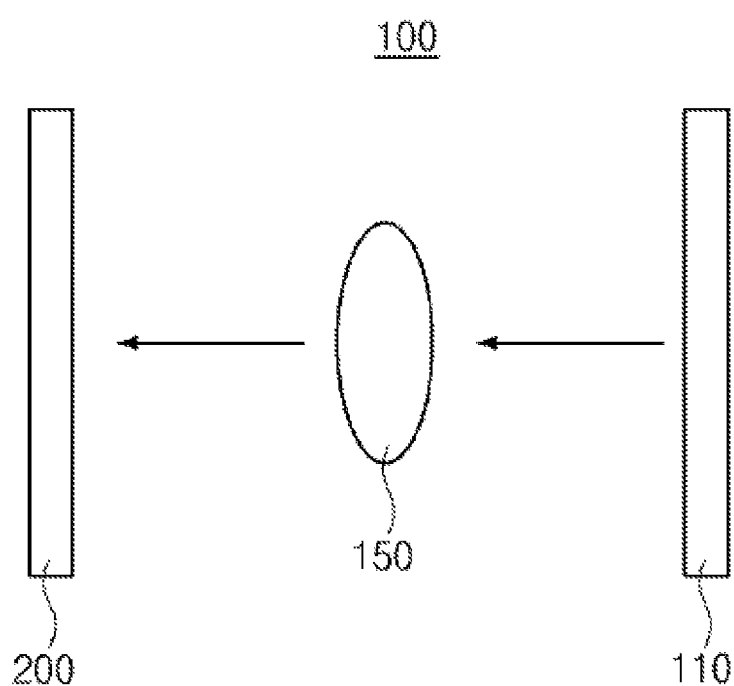
FIG. 1 is a diagram schematically illustrating an imaging device using an image sensor according to an embodiment of the present invention.
Figure 2:
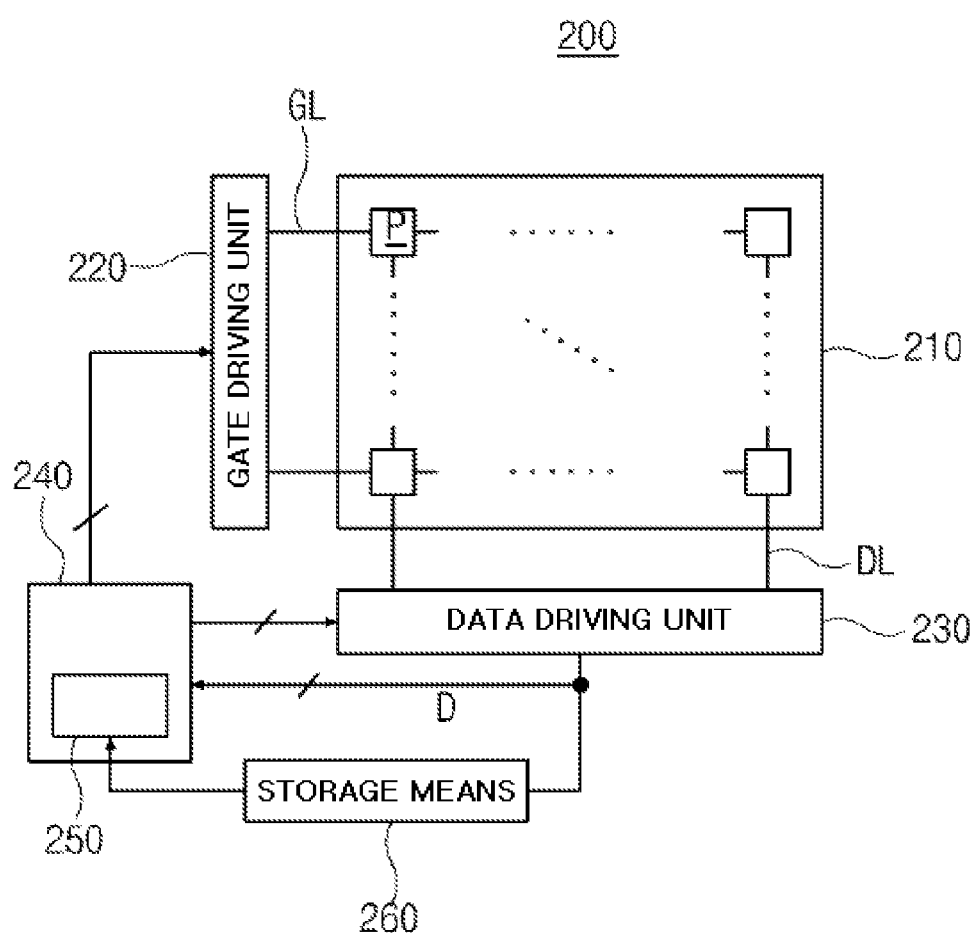
FIG. 2 is a block diagram schematically illustrating an image sensor according to an embodiment of the present invention.

FIG. 1 is a diagram schematically illustrating an imaging device using an image sensor according to an embodiment of the present invention, and FIG. 2 is a block diagram schematically illustrating an image sensor according to an embodiment of the present invention.

As an imaging device 100 according to an embodiment of the present invention, an image device for acquiring images by detecting various types of light, such as X-rays or visible rays, may be used. For the convenience of description, an X-ray imaging device for acquiring an X-ray image is given as an example.

The imaging device 100 may include an X-ray irradiator 110 for generating X-rays and irradiating the X-rays onto a subject 150, and an image sensor 200 for detecting X-rays having passed through the subject.

Here, the image sensor 200 is a component driven in an auto trigger-type, and does not perform communication for signal transmission with the X-ray irradiator 110.

Meanwhile, either a direct conversion-type image sensor for directly converting X-rays into electrical signals or an indirect conversion-type image sensor for converting X-rays into visible rays and then converting the visible rays into electrical signals may be used as the image sensor 200.

Here, when the indirect conversion-type image sensor is used, the image sensor 200 includes a scintillator for converting X-rays into visible rays. In this case, the scintillator may be made of cesium iodide (CsI), but it is not limited thereto.

Referring to FIG. 2, the image sensor 200 may include a photoelectric conversion panel 210 and a driving circuit unit.

The photoelectric conversion panel 210 is a component functioning to convert incident light into an electrical signal. On the photoelectric conversion panel 210, multiple gate lines GLs extend along a row direction and multiple data lines DLs extend along a column direction. Further, pixels P, which are units by which a photoelectric conversion function is performed, are arranged in a matrix form along multiple row lines and multiple column lines, and are connected to corresponding gate lines and corresponding data lines GLs and DLs.

In each of the pixels P, a switching element connected to the corresponding gate line GL and the corresponding data line DL, and a photoelectric conversion element, such as a photodiode electrically connected to the switching element, are configured.

The photoelectric conversion element converts incident light into an electrical signal. The electrical signal converted in this way, that is, a data signal D, is transferred to the corresponding data line DL when the switching element is turned on.

The driving circuit unit may include a gate driving circuit 220, a data driving circuit 230, a control circuit 240, and a light irradiation determination unit 250.

The control circuit 240 outputs a control signal to the gate driving circuit 220 and the data driving circuit 230, and then controls the operations of the driving circuits 220 and 230. Meanwhile, the control circuit 240 may receive data signals D from the data driving circuit 230 and may transfer the data signals D on a frame basis to a system circuit provided outside the image sensor 200.

The operation of the gate driving circuit 220 is controlled in response to a gate control signal supplied from the control circuit 240. The gate driving circuit 220 sequentially scans the gate lines GLs, and applies gate signals at a turn-on level to the gate lines. Accordingly, respective row lines are sequentially selected, and data signals D, stored in pixels P located at the selected row lines, may be output to the corresponding data lines DLs.

The gate control signal may include a start pulse signal STV, a clock pulse signal CPV, an output enable signal OE, etc. Here, the start pulse signal STV indicates a first row line in a frame, and gate signals are output in synchronization with the clock pulse signal CPV. Meanwhile, the output of gate signals from the gate driving circuit 220 is turned on or off in response to the output enable signal OE, and the enabling/disabling of signal output is determined depending on the signal level of the output enable signal OE.

The operation of the data driving circuit 230 is controlled in response to a data control signal supplied from the control circuit 240. The data driving circuit 230 receives data signals D, stored at respective pixels P, through the data lines DLs on a row line basis. The data signals D, received in this way, are transferred to the control circuit 240.

The light irradiation determination unit 250 may determine whether light has been irradiated, and may generate a trigger signal if it is determined that light has been irradiated. In response to the trigger signal generated in this way, the control circuit 240 acquires images based on light irradiation by controlling the operations of the gate driving circuit 220 and the data driving circuit 230.

In an embodiment of the present invention, for the convenience of description, the case where the light irradiation determination unit 250 is configured in the control circuit 240 is given as an example. Meanwhile, unlike this example, the light irradiation determination unit 250 may be configured outside the control circuit 240 or inside the data driving circuit 230.

In relation to the determination of whether light has been irradiated, the light irradiation determination unit 250 detects variation between data signals in the corresponding row line on a frame basis, and then determines whether light has been irradiated.

Meanwhile, data signals in the row lines, which are sequentially output from the data driving circuit 230, may be input to and stored in storage means 260. For example, a frame memory 260 that stores frame-based data signals may be used as the storage means 260, but the storage means is not limited thereto.

In this way, the data signals stored in the storage means 260 may be input to the light irradiation determination unit 250 on a row line basis.

Accordingly, the light irradiation determination unit 250 may receive data signals in a row line, read from a current frame, and data signals in the same row line in a previous frame, stored in the storage means 260, and may detect variation between the data signals in the corresponding row line.

Hereinafter, a light irradiation determination method according to an embodiment of the present invention will be described in detail with reference to the attached drawings.

Figure 3:
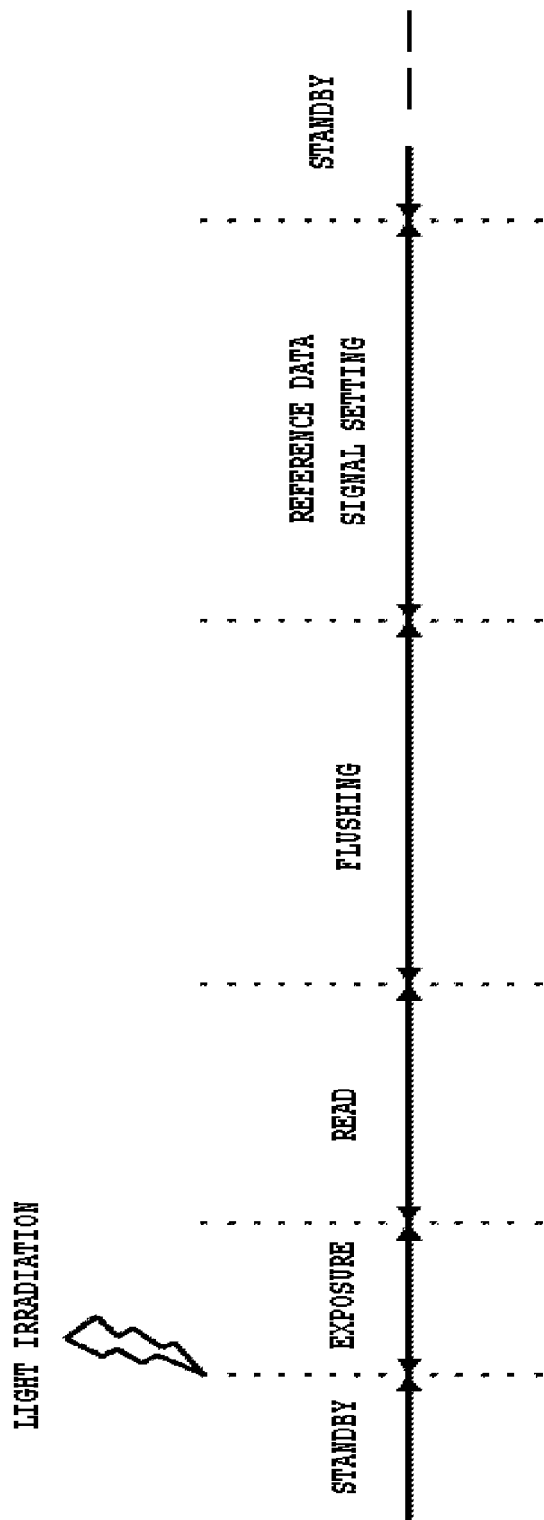
FIG. 3 is a diagram schematically illustrating the driving sequence of an image sensor according to an embodiment of the present invention.
Figure 4:
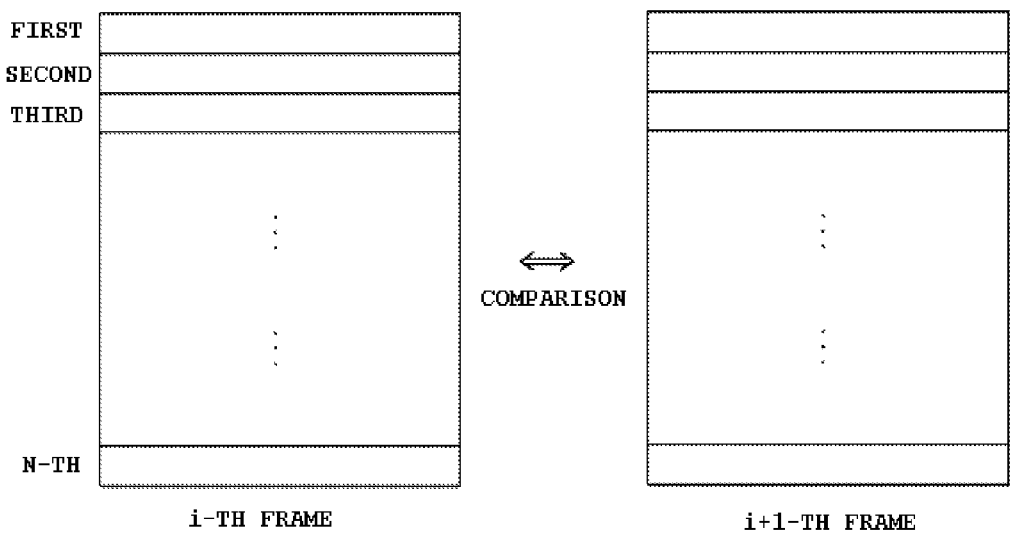
FIG. 4 is a diagram illustrating a method by which a light irradiation determination unit determines whether light has been irradiated according to an embodiment of the present invention.
Figure 5:
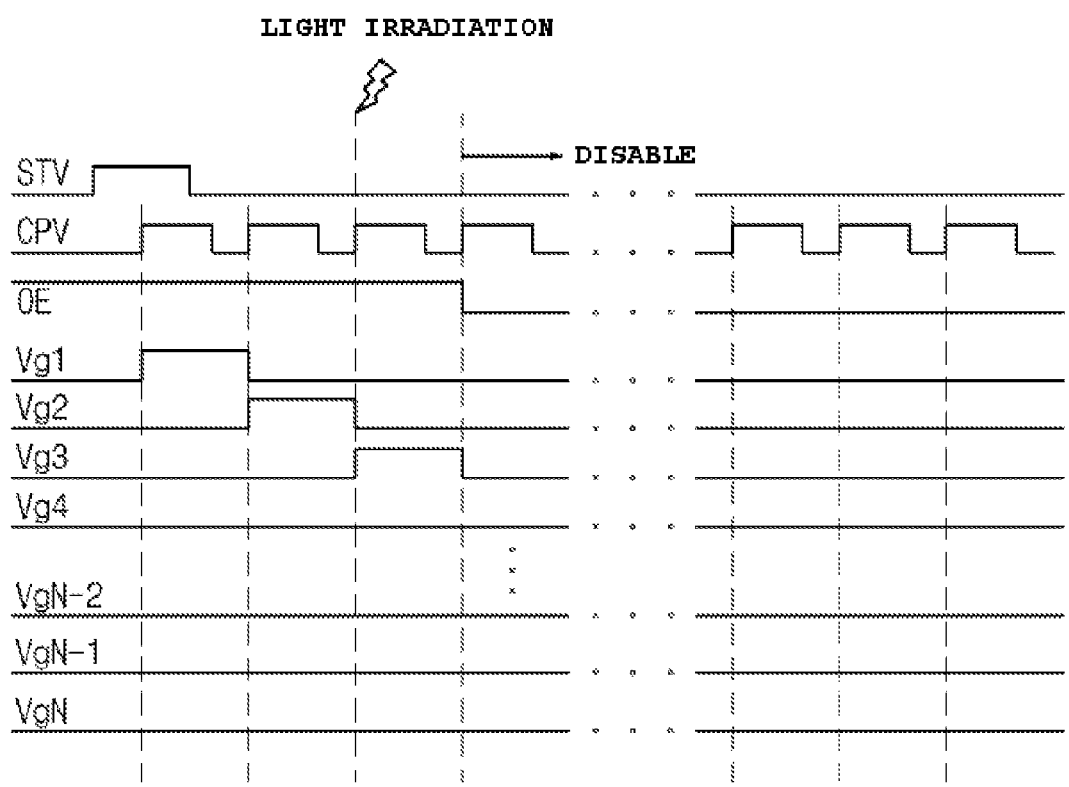
FIG. 5 is a signal waveform diagram when light irradiation occurs in an image sensor according to an embodiment of the present invention.

FIG. 3 is a diagram schematically illustrating the driving sequence of the image sensor according to an embodiment of the present invention, FIG. 4 is a diagram illustrating the method by which the light irradiation determination unit determines whether light has been irradiated according to an embodiment of the present invention, and FIG. 5 is a signal waveform diagram when light irradiation occurs in the image sensor according to an embodiment of the present invention.

Referring to FIG. 3, the image sensor 200 according to the embodiment of the present invention determines whether light has been irradiated in a standby mode state (i.e. in a ready state). For this operation, the image sensor 200 reads data signals from the photoelectric conversion panel 210 by operating the gate driving circuit 220 and the data driving circuit 230. That is, the gate driving circuit 220 sequentially selects row lines in each frame, and the data driving circuit 230 reads data signals in the selected row lines.

The read data signals in row lines are sequentially input to the light irradiation determination unit 250. Further, the read data signals in row lines are also input to and stored in the storage means 260. Furthermore, after the data signals in row lines, input to the storage means 260, are delayed for one frame, they are sequentially output to the light irradiation determination unit 250.

As a result, the light irradiation determination unit 250 compares data signals in each row line in a current frame, which are output from the data driving circuit 230, with data signals in the corresponding row line in a previous frame, which are output from the storage means 260.

In relation to this operation, referring to FIG. 4, variation $\Delta D_n = D_{i+1,n\_avg} - D_{i,n\_avg}$ between the average value $(D_{i+1,n\_avg})$ of data signals in a row line in a current frame, for example, an n-th row line in an i+1-th frame, and the average value $(D_{i,n\_avg})$ of data signals in an n-th row line in an i-th frame, which is a previous frame, is calculated.

Here, as the case where the variation $\Delta D_n$ is equal to or greater than a threshold (greater than 0), when the data signals in the current frame are greater than those in the previous frame, it is determined that light irradiation has occurred. Unlike this, as the case where the variation is less than the threshold, when the data signals in the current frame are less than or equal to those in the previous frame, it is determined that light irradiation has not occurred.

That is, when light irradiation has occurred, light has not been irradiated in the same row line in the previous frame with respect to a light irradiation sensing time as a starting point, and thus the data signals in the row line show a relatively dark state. Therefore, when light irradiation occurs immediately before the n-th row line in the current frame is scanned, data signals in the n-th row line in the previous frame have signal levels corresponding to a relatively dark state, and data signals in the n-th row line in the current frame have signal levels corresponding to a relatively bright state.

Therefore, it may be determined whether light irradiation has occurred, by means of comparison between the magnitudes of data signals in the same row line in neighboring frames. In particular, the scan period of a row line, that is, a horizontal period, is a very short time. According to the embodiment of the present invention, whether light irradiation has occurred may be checked per horizontal period. Therefore, whether light irradiation has occurred may be substantially checked in real time.

Accordingly, if the variation $\Delta D_n$ is less than the threshold and it is determined that light irradiation has not occurred, it is determined whether variation $\Delta D_{n+1}$ between data signals in a subsequent row line is equal to or greater than the threshold value. That is, it is determined whether light irradiation has occurred by comparing data signals in the n+1-th row line in the i-th frame and in the i+1-th frame.

In contrast, if the variation $\Delta D_n$ between the data signals is equal to or greater than the threshold, and it is determined that light irradiation has occurred, a trigger signal is generated, and the driving state of the image sensor 200 is switched to an image acquisition mode in which electrical signals generated by light irradiation are read and images are acquired.

As described above, if it is determined that light irradiation has occurred, the output of gate signals Vg to row lines, arranged subsequent to the row line for which the variation between data signals in the current frame is equal to or greater than the threshold, is disabled.

In relation to this operation, referring to FIG. 5, when light irradiation has occurred immediately before the horizontal period of a third row line, the output of gate signals Vg to row lines ranging from a fourth row line to a last row line, which are located subsequent to the third row line, is disabled.

The disabling of the output of the gate signals may be realized by changing the state of the output enable signal OE. That is, during horizontal periods of the first to third row lines, the output enable signal OE is in an enabled state, that is, in a high state. Thus, when the corresponding row lines are scanned, the gate signals Vg are output, and then data signals in the row lines are read.

In contrast, during horizontal periods of the fourth to last row lines, the output enable signal OE makes a transition to a disabled state, that is, a low state. Thus, when the corresponding row lines are scanned, gate signals Vg are not output, and then the reading of data signals in the row lines is turned off.

When, as described above, an operation for the i+1-th frame that is the frame in which light irradiation is initiated has been completed, the reading of data signals required to acquire images generated by light irradiation starts at a subsequent frame, that is, an i+2-th frame. The reading of signals for image acquisition may be performed for multiple frames.

As described above, with respect to the frame for which light irradiation has been initiated, it is determined whether light has irradiated. During the remaining time of the corresponding frame, an operation of sequentially selecting row lines is performed, but it is not that a signal read operation is performed by turning off the output of gate signals. An operation for image acquisition is initiated from a subsequent frame. Accordingly, the loss of data signals may be prevented when acquiring images.

Meanwhile, in the above description, when variation between data signals is calculated, data signals in at least some of all column lines on the photoelectric conversion panel 210 may be used.

In relation to this function, for example, the averages of data signals in all column lines are calculated using the data signals in the column lines, and it may be determined whether light has been irradiated, based on the variation between the averages of the data signals in frames.

Figure 6:
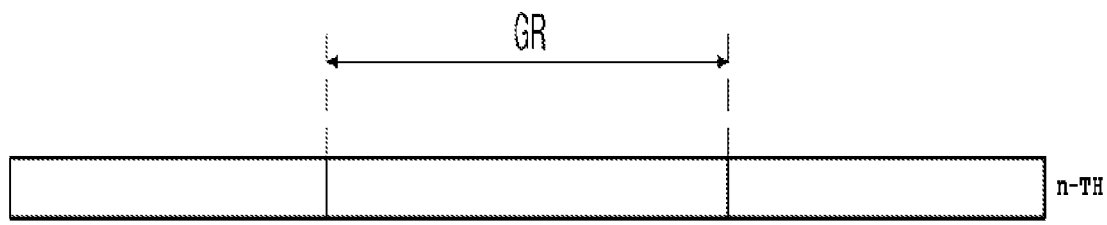
FIGS. 6 and 7 are diagrams illustrating examples of a method by which the light irradiation determination unit calculates variation between data signals according to an embodiment of the present invention.

As another example, as shown in FIG. 6, the averages of data signals in some of all column lines, that is, data signals in a column line group GR, are calculated, and it may be determined whether light has been irradiated, based on variation between the averages of the data signals in frames. Here, it is preferable that the column line group GR be arranged at the center of the column lines, but it is not limited thereto.

Figure 7:
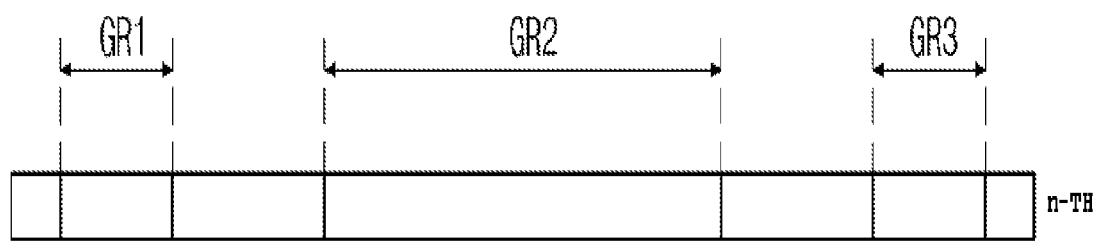

As a further example, as shown in FIG. 7, average values of data signals in multiple column line groups GR1 to GR3 may be respectively calculated. For the convenience of description, the case where three groups, that is, first to third column line groups GR1 to GR3 are used is given as an example. In this case, when variation between the average values of data signals in at least one of the first to third column line groups GR1 to GR3 is equal to or greater than a threshold, it may be determined that light irradiation has occurred.

When the multiple column groups are used in this way, one of them is preferably arranged at the center of column line groups. For example, as shown in FIG. 7, when first to third column line groups GR1 to GR3 are used, they may be configured such that the second column line group GR2 is arranged at the center, and the first and third column line groups GR1 and GR3 are arranged on both sides of the second column line group GR2.

Meanwhile, as described above, after light irradiation has occurred and images based on light irradiation have been acquired, the image sensor 200 returns to a standby mode for subsequent light irradiation.

However, during a predetermined time immediately after image acquisition, data signals generated by light irradiation remain in the photoelectric conversion panel 210. That is, immediately after the image acquisition, the signal levels of the photoelectric conversion panel 210 are gradually decreased and are then stabilized.

Due thereto, if, immediately after the image acquisition, a current state returns to a standby mode, and it is determined whether light has been irradiated, the possibility that an error will occur increases.

Therefore, it is preferable to return to the standby mode and determine whether light has been irradiated if a predetermined time has elapsed immediately after the image acquisition and signal levels have been stabilized.

In relation to this operation, referring to FIG. 3, in an embodiment of the present invention, a stabilization period may be set immediately after the image acquisition, and thus the image sensor 200 may be driven in a stabilization mode. Such a stabilization period corresponds to a delay period required to complete the preparation for subsequent image acquisition, that is, a period required to prepare for a standby mode so as to determine subsequent light irradiation.

For this operation, the stabilization period may be configured to include, for example, a data flushing procedure and a reference data signal setting procedure.

The data flushing procedure is an initialization procedure, by which the data signal levels of the photoelectric conversion panel 210 may substantially return to an initialized state. For example, an operation of applying an initialization signal to each pixel P of the photoelectric conversion panel 210 may be performed. Such a data flushing procedure may be performed, for example, for multiple frames.

After the data flushing procedure, the reference data signal setting procedure may be performed. After the flushing procedure has been performed, the signal levels substantially enter a stabilized state. Accordingly, the reference data signal setting procedure is performed so as to detect data signals in the stabilized state and set the signals as reference data signals for light irradiation detection.

For this operation, the reference data signal setting procedure is performed, for example, by reading data signals for multiple frames and by storing the read data signals in the storage means 260. That is, an update operation of changing data signals in a previous frame to data signals in a current frame is performed.

The data signals finally updated in the storage means 260 are data signals in a stabilized state, and function as reference data signals upon starting the standby mode.

When the reference data signal setting procedure has been completed, that is, when the stabilization mode has been completed, the current state returns to the standby mode in which the reference data signals that are finally updated data signals are used as data signals to be compared with row line data signals in a first frame at the start of the standby mode.

As described above, after the image acquisition mode has been performed, the stabilization period is set to stabilize the levels of data signals, after which the current state returns to the standby mode and it is determined whether light has been irradiated. Accordingly, errors, which may occur in determining whether light has been irradiated in the state in which data signals are unstable, may be minimized.

As described above, in accordance with embodiments of the present invention, variation between data signals in each row line in the current frame and the previous frame is detected, and thus it is determined whether light irradiation has occurred. Therefore, it is possible to promptly and accurately determine whether light has been irradiated, using a convenient method.

Furthermore, after image acquisition has been performed, a stabilization period is set, and the levels of data signals are stabilized, and thereafter the current state returns to a standby mode. Accordingly, errors, which may occur in determining whether light has been irradiated in the state in which data signals are unstable, may be minimized.

The invention claimed is:

1. A method for driving an image sensor, the method being configured to drive an image sensor in which pixels are arranged in a matrix form along row lines and column lines, and which has a standby mode and an image acquisition mode, the method comprising:
when row lines are sequentially selected in each frame in the standby mode, gate signals are applied to the row lines and data signals are read, calculating variation between data signals in a currently selected row line for a current frame and data signals in an identical row line for a previous frame, determining that light has been irradiated if the variation is equal to or greater than a threshold, and disabling output of gate signals to remaining row lines subsequent to the currently selected row line for the current frame if it is determined that light has been irradiated.

2. The method of claim 1, wherein the variation between the data signals is calculated using data signals in at least a part of the column lines.

3. The method of claim 1, wherein the variation between the data signals is variation between average values of the data signals in the row lines.

4. A method for driving an image sensor, the method being configured to drive an image sensor in which pixels are arranged in a matrix form along row lines and column lines, and which has a standby mode and an image acquisition mode, the method comprising:
when row lines are sequentially selected in each frame in the standby mode, gate signals are applied to the row lines and data signals are read, calculating variation between data signals in a currently selected row line for a current frame and data signals in an identical row line for a previous frame, and determining that light has been irradiated if the variation is equal to or greater than a threshold,
wherein the image sensor further includes a stabilization mode, and the image sensor repeatedly performs operations of the standby mode, operations of the image acquisition mode, and operations of the stabilization mode in order.

5. The method of claim 4, further comprising:
if it is determined that light has been irradiated, reading data signals, to which the light has been irradiated, for at least one frame in the image acquisition mode subsequent to current frame; and
after the data signals have been read, stabilizing levels of the data signals in the stabilization mode.

6. The method of claim 5, wherein stabilizing the levels comprises:
initializing the levels of the data signals; and
sequentially reading data signals in the row lines,
wherein variation between data signals in a currently selected row line in a first frame in the standby mode after the stabilizing and data signals in an identical row line finally selected in the stabilization mode is calculated.

7. An image sensor, including a standby mode and an image acquisition mode, comprising:
a photoelectric conversion panel in which pixels are arranged in a matrix form along row lines and column lines;
a gate driving circuit for sequentially selecting the row lines in each frame, and applying gate signals to the row lines;
a data driving circuit for reading data signals from the selected row lines; and
a light irradiation determination unit for calculating variation between data signals in a selected row line in a current frame in the standby mode and data signals in an identical row line in a previous frame, determining that light has been irradiated when the variation is equal to or greater than a threshold, and disabling output of gate signals to remaining row lines subsequent to the currently selected row line in the current frame if it is determined that light has been irradiated.

8. The image sensor of claim 7, wherein the light irradiation determination unit calculates the variation using data signals in at least a part of the column lines.

9. The image sensor of claim 7, wherein the variation between the data signals is variation between average values of the data signals in the row lines.

10. An image sensor, including a standby mode and an image acquisition mode, the image sensor comprising:
a photoelectric conversion panel in which pixels are arranged in a matrix form along row lines and column lines;
a gate driving circuit for sequentially selecting the row lines in each frame and apply gate signals to the row lines;
a data driving circuit for reading data signals from the selected row lines; and
a light irradiation determination unit for calculating variation between data signals in a selected row line in a current frame in the standby mode and data signals in an identical row line in a previous frame and determining that light has been irradiated when the variation is equal to or greater than a threshold,
wherein the image sensor further includes a stabilization mode, and repeats the image sensor repeatedly performs operations of the standby mode, operations of the image acquisition mode, and operations of the stabilization mode in order.

11. The image sensor of claim 10, wherein:
if the light irradiation determination unit determines that light has been irradiated, the data driving circuit reads data signals, to which the light has been irradiated, in the image acquisition mode subsequent to the current frame, and
after the data signals have been read, the gate driving circuit and the data driving circuit stabilize levels of the data signals in the stabilization mode.

12. The image sensor of claim 11, wherein:
in the stabilization mode, the gate driving circuit and the data driving circuit initialize the levels of the data signals and sequentially read data signals in the row lines, and
in a first frame in the standby mode after the stabilization mode, the light irradiation determination unit calculates variation between data signals in a currently selected row line and data signals in an identical row line finally selected in the stabilization mode.

13. The method of claim 1, wherein the image sensor further includes a stabilization mode, and repeats the standby mode, the image acquisition mode, and the stabilization mode.

* * * * *